United States Patent [19]
Ide

[11] Patent Number: 4,807,217
[45] Date of Patent: Feb. 21, 1989

[54] MULTI-CHANNEL STEREO REPRODUCING APPARATUS

[75] Inventor: Teruhisa Ide, Tokyo, Japan
[73] Assignee: Sony Corporation, Tokyo, Japan

[21] Appl. No.: 86,631
[22] PCT Filed: Nov. 18, 1986
[86] PCT No.: PCT/JP86/00588
§ 371 Date: Jul. 22, 1987
§ 102(e) Date: Jul. 22, 1987
[87] PCT Pub. No.: WO87/03449
PCT Pub. Date: Jun. 4, 1987

[30] Foreign Application Priority Data

Nov. 22, 1985 [JP] Japan ............ 60-263158

[51] Int. Cl.[4] ............ H05B 7/094; H04R 5/00; G06K 9/50; G06K 9/48
[52] U.S. Cl. ............ 369/89; 369/90; 381/1; 381/20; 381/22
[58] Field of Search ............ 369/89, 90; 381/1, 18, 381/20, 21, 22, 23

[56] References Cited

U.S. PATENT DOCUMENTS

| | | | |
|---|---|---|---|
| 3,971,890 | 7/1976 | Bauer | 381/18 |
| 4,303,800 | 12/1981 | DeFreitas | 381/18 |
| 4,525,855 | 6/1985 | Willcocks | 381/20 |
| 4,532,647 | 7/1985 | Willcocks | 381/20 X |

FOREIGN PATENT DOCUMENTS

| | | |
|---|---|---|
| 120201 | 10/1974 | Japan . |
| 90801 | 7/1976 | Japan . |
| 62801 | 5/1979 | Japan . |
| 63813 | 4/1984 | Japan . |

*Primary Examiner*—William L. Sikes
*Assistant Examiner*—Akm E. Ullah
*Attorney, Agent, or Firm*—Hill, Van Santen, Steadman & Simpson

[57] ABSTRACT

The present invention provides a multi-channel stereo reproducing apparatus which can reproduce a recording medium such as an audio disc or the like in which in order that users can enjoy screen musics or the like reproduced at, for example, a concert hall and a movie theater. In the de-emphasis circuit is by-passed, whereby, when reproducing a recording medium on which a multi-channel stereo signal in which the high frequency component of the rear signal B is pre-emphasized is recorded, a high frequency component of a delayed difference signal t (L−R) supplied to the rear loudspeaker is de-emphasized so as to make the total frequency characteristic relative to the rear signal B flat, while when reproducing the recording medium on which the 2-channel stereo signal formed of only the left and right front signals L and R in which the center front signal F and the rear signal B are not encoded at all is recorded, the de-emphasis circuit is by-passed so as to prevent the delayed difference signal t (L−R) supplied to the rear loudspeaker from being attenuated to thereby, in either cases, present satisfactory stereo presence.

4 Claims, 3 Drawing Sheets

MULTI-CHANNEL STEREO REPRODUCING APPARATUS

TECHNICAL FIELD

The present invention relates to multi-channel stereo reproducing apparatus and particularly to a multi-channel stereo reproducing apparatus which can selectively reproduce a recording medium such as a video disc or the like (a so-called Dolby surround-phonic sound system stereo) on which a multi-channel stereo signal is recorded such that a high frequency component of its rear signal is pre-emphasized for listeners to enjoy screen music reproduced at a concert hall and a movie theater, and a recording medium on which a standard 2-channel stereo signal is recorded.

BACKGROUND ART

When a motion picture is shown at a concert hall and a movie theater, an audio signal is generally reproduced by means of Dolby surround-phonic sound system 4-channel stereo reproducing system to urge audiences to feel as if they were in the very place shown on the picture screen.

When a motion picture for a movie theater is produced, a video signal is recorded and at the same time, left front sound, right front sound, center front sound and rear sound are recorded respectively. In this case, a left front signal $L_F$, a right front signal $R_F$, a center front signal F and a rear signal B are encoded respectively and then recorded on a video disc or a magnetic tape as LT and RT signals, respectively. In this case, in order to improve a signal-to-noise ratio, or a so-called S/N ratio of the rear signal B, there is employed a so-called modified B-type Dolby system in which a high frequency component higher than 1 kHz is emphasized (pre-emphasis) by a predetermined amount and then recorded. FIG. 3 illustrates frequency vs. response characteristics in the case where the recording level is at 0 dB, −10 dB, −20 dB and −30 dB in this modified B-type Dolby system. Then, the left front signal $L_F$, the right front signal $R_F$, the center front signal F and the rear signal B thus recorded are further encoded to a left composite signal $L_T$ and a right composite signal $R_T$ which are respectively expressed as $L_T=L_F+(F/2+2)$ and $R_T=R_F+(F/2)-(B/2)$. These left and right composite signals $L_T$ and $R_T$ are optically recorded, in the case of, for example, a 35 mm film, at a sound track portion located at a predetermined position of the film according to the brightness change system which carries out the recording on the basis of the change of light and shade of, for example, the coloring. Accordingly, when a motion picture is shown, the left and right composite signals $L_T$ and $R_T$ thus optically recorded are decoded so as to produce four signals of the left composite signal $L_T$, the right composite signal $R_T$, a sum signal $L_T+R_T$ of the left composite signal $L_T$ and the right composite signal $R_T$ and a difference signal $L_T-R_T$ of the left composite signal $L_T$ and the right composite signal $R_T$. Then, these four signals are reproduced by a left front loudspeaker, a right front loudspeaker, a center front loudspeaker and a rear loudspeaker. In this case, since the high frequency component of the rear signal B is pre-emphasized by the modified B-type Dolby system as described hereinabove, upon reproducing, the high frequency component of the difference signal $L_T-R_T$ is attenuated (de-emphasized) so as to make a total frequency characteristic flat relative to the rear signal B. When the audio signal is reproduced by such 4-channel stereo reproducing system, the sound effect is enhanced to provide presence so that the listeners are urged to feel as if they were in the very place shown on the picture screen.

By the way, a magnetic tape and a video disc by which the user can enjoy the screen music recorded thereon for the motion picture or the mortion picture itself are now available on the market. In this case, since the recorded signals recorded on the magnetic tape and the video disc are the composite signals $L_T$ and $R_T$ as described hereinabove, there is proposed a multi-channel stereo reproducing apparatus illustrated in FIG. 1.

In FIG. 1, reference numerals 1 and 2 respectively designate left and right composite signal input terminals to which the left and right composite signals $L_T$ and $R_T$ are supplied. The respective left and right composite signal input terminals 1 and 2 are connected to the input side of a balancing circuit 3, and the balancing circuit 3 produces at its output sides left and right composite signals $L_T$ and $R_T$ which are so balanced as to localize an acoustic image normally.

The output sides of the balancing circuit 3 are connected through amplifiers 4 and 5 to left and right front loudspeakers 6 and 7 which respectively reproduce the left and right composite signals $L_T$ and $R_T$ supplied to the left and right composite signal input terminals 1 and 2.

Also, the output sides of the balancing circuit 3 are connected to the input side of a mixing circuit 8 which generates at its output side the sum signal $L_T+R_T$ of the left and right composite signals $L_T$ and $R_T$. The output side of the mixing circuit 8 is connected through an amplifying circuit 9 to a center front loudspeaker 10 which reproduces the sum signal $L_T+R_T$ developed at the output side of the mixing circuit 8.

Further, the output sides of the balancing circuit 3 are connected to the input sides of a subtracting circuit 11 and the subtracting circuit 11 generates at its output side the left and right composite signals $L_T$ and $R_T$ of which the monaural components are removed. The output side of the subtracting circuit 11 is connected to the input side of a delay circuit 12, and the delay circuit 12 generates at its output side a delayed difference signal $\Delta t$ $(L_T-R_T)$ which is delayed by a predetermined delay time. Thus, a front localization feeling and a widening feeling of sound field are obtained. The output side of the delay circuit 12 is connected to the input side of a filter for passing therethrough a signal of low frequency band, that is, so-called low pass filter 13, and the low pass filter 13 generates at its output side the delayed difference signal $\Delta t$ $(L_T-R_T)$ in which a clock pulse component given by the passing of the signal through the delay circuit 12 and the like are removed and the high frequency component higher than a predetermined frequency is removed so as to balance the low frequency component which is not sufficient in the difference signal $L_T-R_T$. The output side of the low pass filter 13 is connected to the input side of a de-emphasis circuit 14 which attenuates the high frequency component of the delayed difference signal $\Delta t$ $(L_T-R_T)$ higher than 1 kHz, thus producing a delayed difference signal $\Delta t$ $(L_T-R_T)$ in which the total frequency characteristic of the rear ? signal B of which the high frequency component higher than 1 kHz is emphasized in response to the response thereof is made flat. Then, the output side of the de-emphasis circuit 14 is connected through amplifying circuits 15 and 16 to left and right rear loudspeakers 17 and 18 by which the delayed difference signal $\Delta t\ (L_T-R_T)$ in which the T frequency characteristic of the rear signal B is made flat, is reproduced.

In the conventional multi-channel stereo reproducing apparatus thus constructed, the left and right composite signals $L_T$ and $R_T$ are reproduced from the left and right front loudspeakers 6 and 7, the sum signal $L_T+R_T$ is reproduced from the center front loudspeaker 10 and the delayed difference signal $\Delta t\ (L_T-R_T)$ is reproduced from the left and right rear loudspeakers 17 and 18.

Consequently, according to such known multi-channel stereo reproducing apparatus, the sound effect is enhanced to produce good stereo presence the same as that in the concert hall.

However, by such conventional multi-channel stereo reproducing apparatus, when reproducing a recording medium, such as, a record disk, a cassette tape and so on available on the market and on which the standard 2-channel stereo signal formed of the left front signal $L_F$ and the right front signal $R_F$ in which the center front signal F and the rear signal B are not encoded at all are recorded, since the delayed difference signal $\Delta t\ (L_F-R_F)$ from the delay circuit 12 passes through the de-emphasis circuit 14, its high frequency component higher than 1 kHz is attenuated. Then, the delayed difference signal $\Delta t\ (L_F-R_F)$ of which the high frequency component is attenuated is reproduced from the left and right rear loudspeakers 17 and 18, so that the high frequency component of the sound reproduced by the rear loudspeakers is attenuated unnaturally. Thus, satisfactory stereo presence can not be obtained.

DISCLOSURE OF INVENTION

In view of such aspects, the present invention is to provide a multi-channel stereo reproducing apparatus which can selectively reproduce a recording medium on which a multi-channel stereo signal in which the high frequency component of the rear signal is pre-emphasized is recorded and a recording medium on which a standard 2-channel stereo signal is recorded.

According to the present invention, in a multi-channel stereo reproducing apparatus which is so arranged as to reproduce a recording medium in which if a left front signal is taken as $L_F$, a right front signal is taken as $R_F$, a center front signal is taken as F and a rear signal is taken as B, these signals are encoded to left and right composite (signals $L_T$ and $R_T$ expressed as $L_T=L_FF/2)+(B/2)$ and $R_T=R_F+(F/2)-(B/2,)$ the high frequency component of the rear signal B is pre-emphasized and then they are recorded, this apparatus is provided with a matrix circuit for producing a left composite signal $L_T$, a right composite signal $R_T$, a sum signal $L_T+R_T$ of the left composite signal $L_T$ and the right composite signal $R_T$ and a difference signal $L_T-R_T$ of the left composite signal $L_T$ and the right composite signal $R_T$, a reproducing circuit for reproducing the left composite signal $L_T$, the right composite signal $R_T$ and the sum signal $L_T+R_T$ and a reproducing circuit for reproducing the difference signal $L_T-R_T$ through a delay circuit and a de-emphasis circuit, wherein when reproducing a recording medium in which the 2-channel stereo signal formed of only the left and right front signals $L_F$ and $R_F$ in which the center front signal F and the rear signal B are not encoded at all is recorded, the de-emphasis circuit can be bypassed.

BEST MODE FOR CARRYING OUT THE INVENTION

Figure 1:
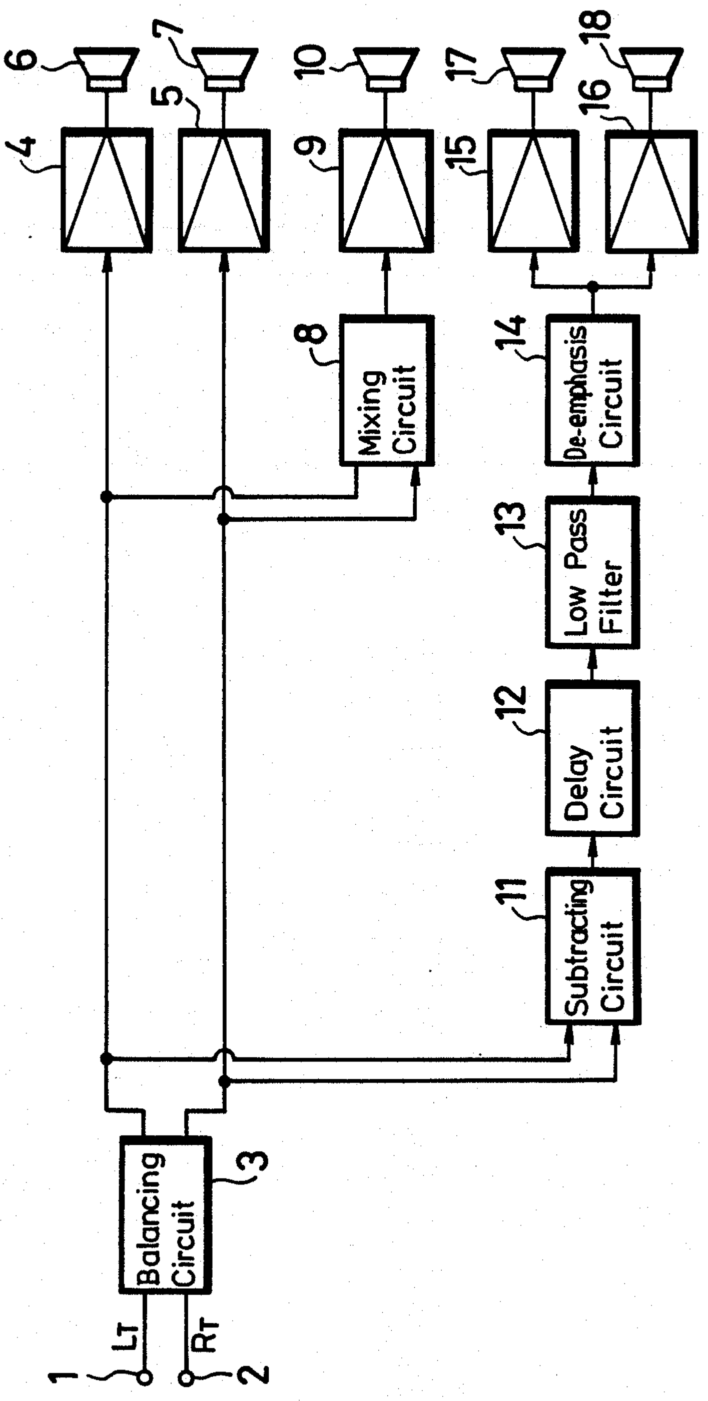
FIG. 1 (PRIOR ART)
FIG. 1 is a block diagram showing an example of a conventional multi-channel stereo reproducing apparatus.
Figure 2:
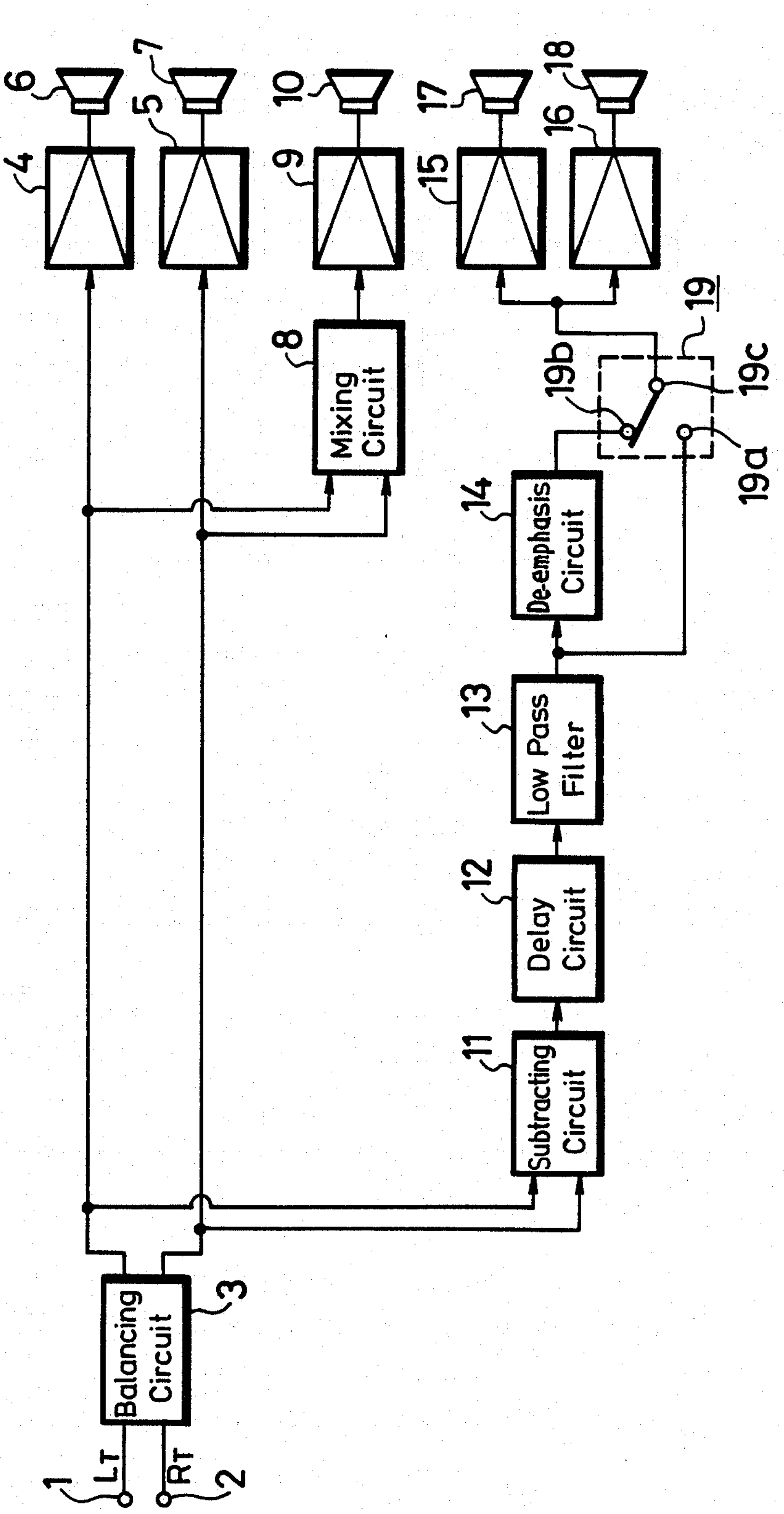
FIG. 2 is a block diagram showing an embodiment of a multi-channel stereo reproducing apparatus according to the present invention and FIG. 3 is a graph used o explain the present invention.
Figure 3:
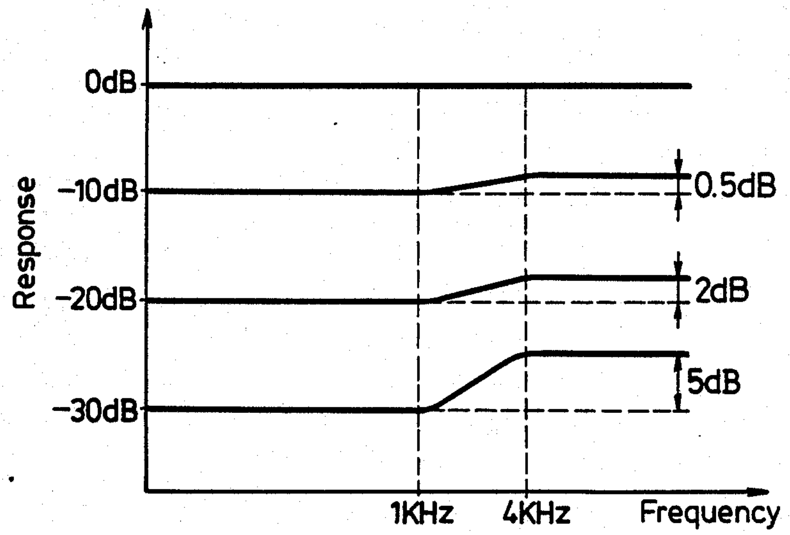

An embodiment of a multi-channel stereo reproducing apparatus according to the present invention will hereinafter be described with reference to FIG. 2. In FIG. 2, like parts corresponding to those of FIG. 1 are marked with the same references and will not be described in detail.

In accordance with this embodiment, the output side of the low pass filter 13 is connected to the input side of the de-emphasis circuit 14 and to one fixed contact 19*a* of a change-over switch 19. In this case, the de-emphasis circuit 14 is adapted to de-emphasize the high frequency component of the audio signal pre-emphasized by the modified B-type Dolby system to thereby make the total frequency characteristic flat.

The output side of the de-emphasis circuit 14 is connected to the other fixed contact 19*b* of the change-over switch 19 and a movable contact 19*c* of the change-over switch 19 is connected through the amplifying circuits 15 and 16 to the left and right rear loudspeakers 17 and 18, whereby the de-emphasis circuit 14 can be bypassed, if necessary. Other arrangements are formed the same as those of the prior art shown in FIG. 2.

In the thus constructed multi-channel stereo reproducing apparatus of this embodiment, when the movable contact 19*c* of the change-over switch 19 is connected to the other fixed contact 19*b*, the circuit arrangement is formed the same as that of the example of the prior art in FIG. 2. Accordingly, the left front signal $L_F$, the right front signal $R_F$, the center front signal F and the rear signal B are encoded respectively to the left and right composite signals $L_T$ and $R_T$ which are respectively expressed as $L_T=L_F+(F/2)+(B/2)$ and $R_T=R_F+(F/2)-(B/2)$. At the same time, when reproducing a recording medium on which a high frequency component of the rear signal B higher than 1 kHz is pre-emphasized by the modified B-type Dolby system and recorded, for example, a video disc or the like on which screen music or the like recorded for the motion picture is recorded, the left composite signal $L_T=L_F+(F/2)+(B/2)$ is reproduced from the left front loudspeaker 6, the right composite signal $R_T=R_F+(F/2)-(B/2)$ is reproduced from the right front loudspeaker 7, the sum signal $L_T+R_T=L_F+R_F+F$ of the left composite signal $L_T$ and the right composite signal $R_T$ is reproduced from the center front loudspeaker 10 and the delayed difference signal $\Delta t\ (L_T-R_T)=\Delta t\ (L_F-R_F+B)$ is reproduced from the left and right rear loudspeakers 17 and 18. In this case, since 5 the delayed difference signal $\Delta t\ (L_T-R_T)=\Delta t\ (L_F-R_F+B)$ is reproduced in such a manner that its high frequency component is attenuated by the de-emphasis circuit 14 and that its total frequency characteristic relative to the rear signal B is made flat, the sound effect can be enhanced to produce stereo presence the same as that obtained in the concert hall and the movie theater.

According to the multi-channel stereo reproducing apparatus of this embodiment, it is possible to reproduce the standard 2-channel stereo signal formed of the left and right front signals $L_F$ and $R_F$ in which the center front signal F and the rear signal B are not encoded at all. In this case, when the left and right front signals $L_F$ and $R_F$ are supplied to the left and right composite signal input terminals 1 and 2, the left and right front signals $L_F$ and $R_F$ are reproduced from the left and right loudspeakers 6 and 7, the sum signal $L_F+R_F$ of the left front signal $L_F$ and the right front signal $R_F$ is reproduced from the center front loudspeaker 10 and the delayed difference signal $\Delta t\ (L_F-R_F)$ which results from delaying the difference signal $L_F-R_F$ of the left front signal $L_F$ and the right front signal $R_F$ by a predetermined delay time is reproduced from the rear loudspeakers 17 and 18. In addition, according to this embodiment, since the movable contact 19*c* of the change-over switch 19 is connected to one fixed contact 19*a* to by-pass the de-emphasis circuit 14 to thereby directly connect the output side of the low pass filter 13 to the amplifying circuits 15 and 16, without attenuating the high frequency component of the delayed difference signal $\Delta t\ (L_F-R_F)$ obtained at the output side of the low pass filter 13, this delayed difference signal At $(L_F-R_F)$ can be reproduced. When the delayed difference signal $\Delta t\ (L_F-R_F)$ is reproduced together with the left front signal $L_F$, the right front signal $R_F$ and the sum signal $L_F+R_F$, it is well known that stereo presence can be increased and hence the atmosphere as presented at the concert hall and the movie theater can be obtained.

Consequently, according to this embodiment, it is possible to selectively reproduce the recording medium in which the left front signal $L_F$, the right front signal $R_F$, the center front signal F and the rear signal B are encoded respectively to the left and right composite signals $L_T$ and $R_T$ expressed as $L_T=L_F+(F/2)\ (B/2)$ and $R_T=R_F+(F/2)-(B/2)$ and the high frequency component of the rear signal B is pre-emphasized by the modified B-type Dolby system and the recording medium for the standard 2-channel stereo signal formed of the left and right front signals $L_F$ and $R_F$ in which the center front signal F and the rear signal B are not encoded at all. In either cases, it is possible to obtain the stereo presence the same as that obtained at the concert hall and the movie theater.

While in the above embodiment, the present invention is applied to the multi-channel stereo reproducing apparatus for reproducing a recording medium on which the multi-channel stereo signal in which the rear signal B is pre-emphasized by the modified B-type Dolby system is recorded as described hereinabove, the present invention is not limited to the above mentioned embodiment but can be applied to a multi-channel stereo reproducing apparatus for reproducing a recording medium on which a signal pre-emphasized by other noise reduction system is recorded or such an apparatus in which the above delay circuit is formed of a digital circuit having an A/D converter and a D/A converter. It can easily be understood that the same action and effect as described above can be achieved also in this case.

It is needless to say that the present invention is not limited to the afore-mentioned embodiment but can take various modifications without departing from the gist of the present invention.

I claim:

1. In a multi-channel stereo reproducing apparatus for reproducing a recording medium on which if a left front signal is taken as $L_F$, a right front signal is taken as $R_F$, a center front signal is taken as F and a rear signal is taken as B, these signals are encoded to left and right composite signals $L_T$ and $R_T$ respectively expressed as $L_T=L_F+(F/2)+(B/2)$ and $R_T=R_F+(F/2)-(B/2)$, the high frequency component of said rear signal B is pre-emphasized and then they are recorded, said multi-channel stereo reproducing apparatus being characterized in that there are provided a matrix circuit for producing said left composite signal $L_T$, said right composite signal $R_T$, a sum signal $L_T+R_T$ of said left composite signal $L_T$ and said right composite signal $R_T$ and a difference signal $L_T-R_T$ of said left composite signal $L_T$ and said right composite signal $R_T$, reproducing circuit for reproducing said left composite signal $L_T$, said right composite signal $R_T$ and said sum signal $L_T+R_T$ and a reproducing circuit for reproducing said difference signal $L_T-R_T$ through a delay circuit and a de-emphasis circuit, wherein the improvement is provided means for by-passing said de-emphasis circuit when reproducing a recording medium on which a 2-channel stereo signal formed of only said left and right front signals $L_F$ and $R_F$ is recorded in which the center front signal F and the rear signal B are not encoded at all is recorded so that the high frequency component of the sound reproduced by the rear loudspeakers is alternated unnaturally.

2. A multi-channel stereo reproducing apparatus according to claim 1, wherein said by-pass means is formed of a change-over switch having a pair of fixed contacts and a movable contact, said pair of fixed contacts being respectively connected to the input and output sides of said de-emphasis circuit, and said movable contact being connected to the output side of said reproducing circuit.

3. A multi-channel stereo reproducing apparatus according to claim 2, wherein said de-emphasis circuit is given a frequency characteristic in which a signal level of a high frequency is emphasized in response to a signal level of said difference signal $L_T-R_T$.

4. A multi-channel stereo reproducing apparatus according to claim 3, wherein said frequency characteristic is such one that when the signal level is about 30 dB, a signal level of a signal higher than about 4 kHz is emphasized by 5 dB.

* * * * *